(12) United States Patent
Lavergne et al.

(10) Patent No.: US 8,039,825 B2
(45) Date of Patent: Oct. 18, 2011

(54) INSTALLATION FOR EXPOSING A CINEMATOGRAPHIC FILM FROM DIGITAL IMAGES

(75) Inventors: Patrice Lavergne, Monteynard (FR); Ke-Hua Lan, Grenoble (FR); Christian Croll, Claix (FR)

(73) Assignee: Photo Me Holding France, Échirolles (FR)

( * ) Notice: Subject to any disclaimer, the term of this patent is extended or adjusted under 35 U.S.C. 154(b) by 310 days.

(21) Appl. No.: 12/507,118

(22) Filed: Jul. 22, 2009

(65) Prior Publication Data

US 2010/0060856 A1    Mar. 11, 2010

(30) Foreign Application Priority Data

Sep. 11, 2008  (FR) .................................. 08 56091

(51) Int. Cl.
*G01N 21/86*    (2006.01)
*G03B 19/18*    (2006.01)

(52) U.S. Cl. .......... 250/548; 250/216; 353/35; 358/302; 352/140

(58) Field of Classification Search .................. 250/548, 250/216, 221; 353/35, 104, 108; 355/64, 355/65, 68; 358/296, 302; 352/92, 139, 352/140, 166

See application file for complete search history.

(56) References Cited

U.S. PATENT DOCUMENTS

| | | | |
|---|---|---|---|
| 4,903,068 A | 2/1990 | Shiota | |
| 4,933,773 A | 6/1990 | Shiota et al. | |
| 4,956,663 A | 9/1990 | Gerstch | |
| 5,424,802 A | 6/1995 | Saita | |
| 5,636,001 A * | 6/1997 | Collier | ............................ 355/41 |
| 5,870,205 A | 2/1999 | DeClerck et al. | |
| 6,734,993 B1 | 5/2004 | Damm et al. | |
| 2003/0147144 A1 | 8/2003 | Roddy et al. | |
| 2004/0233406 A1 | 11/2004 | Lan et al. | |

FOREIGN PATENT DOCUMENTS

| | | |
|---|---|---|
| EP | 0308967 | 3/1989 |
| EP | 0356345 | 2/1990 |
| EP | 1335582 | 8/2003 |
| FR | 2783387 | 3/2000 |
| FR | 2836238 | 8/2003 |
| JP | 08006181 | 1/1996 |
| WO | WO-03071778 | 8/2003 |

OTHER PUBLICATIONS

European Patent Office, International Search Report, dated May 19, 2009 (3 pgs French language).

* cited by examiner

*Primary Examiner* — Kevin Pyo

(57) ABSTRACT

This installation includes: a light source; means for storing film photoresist for exposure and exposed photoresist; a film carrier for positioning said film photoresist at an exposure plane; a projection lens capable of projecting the digital images at the exposure plane; a liquid crystal matrix where the various digital images to be exposed are displayed; a retractable mirror oriented at 45° to an optical axis of the projection lens; and an image analysis device positioned symmetrically to said exposure plane with regard to the plane containing said mirror when the latter is in place on the optical axis. When said mirror is positioned on the optical axis, the image analysis device is suitable for receiving the image transmitted by the liquid crystal matrix issuing from the projection lens. The signals thereby detected are processed using an associated software, for setting the characteristics of the optical members of the installation.

11 Claims, 2 Drawing Sheets

INSTALLATION FOR EXPOSING A CINEMATOGRAPHIC FILM FROM DIGITAL IMAGES

CROSS REFERENCE TO RELATED APPLICATION

This application clams priority under 35 U.S.C. §119 from French Patent Application No. 0856091 filed on Sep. 11, 2008 in the French Patent Office, the entire disclosure of which is incorporated herein by reference.

FIELD OF THE INVENTION

The present invention relates to the exposure of silver films for projecting motion pictures. More particularly, it relates to the field of cinematographic postproduction.

Conventionally, motion picture films, that is, films shown in cinemas, are obtained optically by contact with an intermediate negative film, referred to in the profession as "intermediate".

In the conventional system, this intermediate film is obtained by two contact steps from the shooting film, that is, from the film directly issuing from the cinematographic camera, which is also negative. These two steps consist respectively of the interpositive and the internegative.

In the context of the present invention, the "intermediate" film is obtained by projection of a digital image on a film photoresist support, and therefore relates to the system referred to as "digital intermediate" in the field concerned.

The invention therefore relates to an installation for fabricating such an "intermediate" film from digital images, the produced film then being used either as a "master" of projection films, in particular by contact, or to archive the cinematographic work, in particular on black and white support, or even to produce the so-called prestige film, that is, the direct exposure of the projection film to avoid MTF (modulation transfer function) losses due to the contact printing.

BACKGROUND OF INVENTION

It is important first to stipulate that the field called cinematographic postproduction operates according to two resolutions, respectively the resolution called 2K, meaning in theory 2048×1556 pixels, and 4K also meaning in theory 4096×3112 pixels.

The earliest technology used to make "digital intermediate" films concerns the cathode ray tube (CRT). This technology therefore uses a spot issuing from a cathode ray tube which carries the image to be exposed on the film photoresist.

The accuracy of the spot is conditioned in particular by its energy. In fact, for a high resolution, a low energy spot should be employed, so that the productivity/modulation transfer function ratio, that is, the percentage of spatial data of the starting image that is really transferred to the film support according to the resolution, is mediocre. Furthermore, the geometrical accuracy, the emission spectrum and the purity of the phosphorus layer with which the inside of the tube is coated, require very high quality cathode ray tubes, which are relatively costly, and have a limited service life because the properties of the phosphorus change during its use.

This technology is therefore particularly restrictive in terms of upkeep and maintenance.

The laser technology is also known. This is based on the scanning of a moving object film by three laser beams issuing from solid or gas lasers (for the colors blue and green) and a laser diode (for the color red).

While the resolutions in 2K and 4K can be obtained with this technology, the productivity is however not always adequate, particularly for obtaining a cinemascope film format.

Moreover, the application of the laser technology, particularly the blue laser, is costly in terms of maintenance. In addition, the service life of the lasers is limited.

Finally, the application of the laser implies a film supply system during exposure, synchronized to the nearest fraction of a micron, which is complex and costly to achieve.

The need has therefore arisen to develop a system for making and producing motion picture films from digital images, which can reach a resolution of 2K and 4K, with high production rates, high contrast quality, and reduced operating and maintenance costs.

This is the object of the present invention.

SUMMARY OF THE INVENTION

The present invention therefore relates to an installation for exposing a cinematographic film from digital images, said installation comprising:
  a light source capable of emitting in the three fundamental colors red, green and blue;
  means for storing film photoresist, respectively for exposure and already exposed;
  a film carrier suitable for positioning said film photoresist accurately at the level of the exposure zone; and
  an exposure lens capable of projecting the digital images at the exposure plane of said film carrier.

The installation in question is characterized in that it further comprises:
  a liquid crystal matrix where the various digital images to be exposed are displayed, located on the light beam issuing from the light source;
  a retractable mirror oriented at 45° to the optical axis of the projection lens; and
  an image analysis device positioned symmetrically to said film carrier exposure plane with regard to the plane containing said mirror when the latter is in place on the optical axis of the projection lens, and suitable, when said mirror is positioned on the optical axis of the projection lens, for receiving the image transmitted by the liquid crystal matrix issuing from the projection lens and, by processing the signals thereby detected using an associated software, for setting the characteristics of the optical members of the installation, in particular of the light source and of the liquid crystal matrix, in addition to the adjustment and control of the focusing of the projection lens.

In other words, the invention consists on the one hand, of using a liquid crystal matrix as an image source, for example having liquid crystals of the LCD type, or CRT or Lcos (LCD on silicon) or deformable mirror device (DMD) ("Digital Micro Mirrors": this system uses a plurality of square micromirrors, each mounted on an axis of rotation, and therefore capable of undergoing a rotation of plus or minus 10° about an original position), and on the other hand, in integrating in said installation means for setting it in terms of optical characteristics for the purpose of optimizing the contrast in the exposed film, of correcting the image non-uniformities inherent in the lighting defect, of vignetting the lens, and also correcting the parameter called PRNU for pixel response non uniformity, as well as focusing by action on the lens.

The integration of these means for optimizing the optical characteristics not only serves to obtain films of better optical quality, but also to save substantial time for the setting of the installation. In fact, in connection with the identification of the prior art, the problems resulting from the optimization of the parameters of such an installation for the purpose of optimizing the optical quality of the films obtained have been discussed.

In most prior art devices, rushes are used for this purpose, issuing from the film obtained by the shooting camera, which is subjected to an analysis by means of conventional devices outside said installation. This automatically means a loss of time.

According to the invention, the image analysis means consists of a charge transfer circuit, conventionally called CCD for charged-coupled device, or even a Cmos or other matrix sensor, of which the signals are transmitted to a microprocessor or electronic circuit board incorporating the processing algorithms required to optimize the parameters of the installation.

According to another feature of the invention, the combination of the liquid crystal or other matrix and the upstream and downstream polarizers, if applicable associated with the matrix, is mounted on a piezoelectric stage, for the lateral shifting of said display assembly or unit, that is, perpendicular to the optical axis of the installation. In doing so, the resolution of the projected image is optimized, as described for example in documents FR-A-2 783 387 and FR-A-2 836 238.

Due to the use of such a piezoelectric stage, the 4K resolution recommended by the profession is very easily obtained.

According to a further advantageous feature of the invention, the installation also comprises a photodiode associated with a lens, located on the optical axis of the projection lens immediately downstream of the film carrier.

The signals thus received by the photodiode can also be processed for densitometric analysis, further serving to measure the response of the liquid crystal matrix.

Other features of the present invention will appear more clearly from the detailed description that follows.

BRIEF DESCRIPTION OF THE FIGURES

The manner in which the invention can be implemented and the advantages thereof will appear more clearly from the exemplary embodiment that follows, provided for information and nonlimiting, in conjunction with the appended figures.

DETAILED DESCRIPTION OF THE INVENTION

Figure 1:
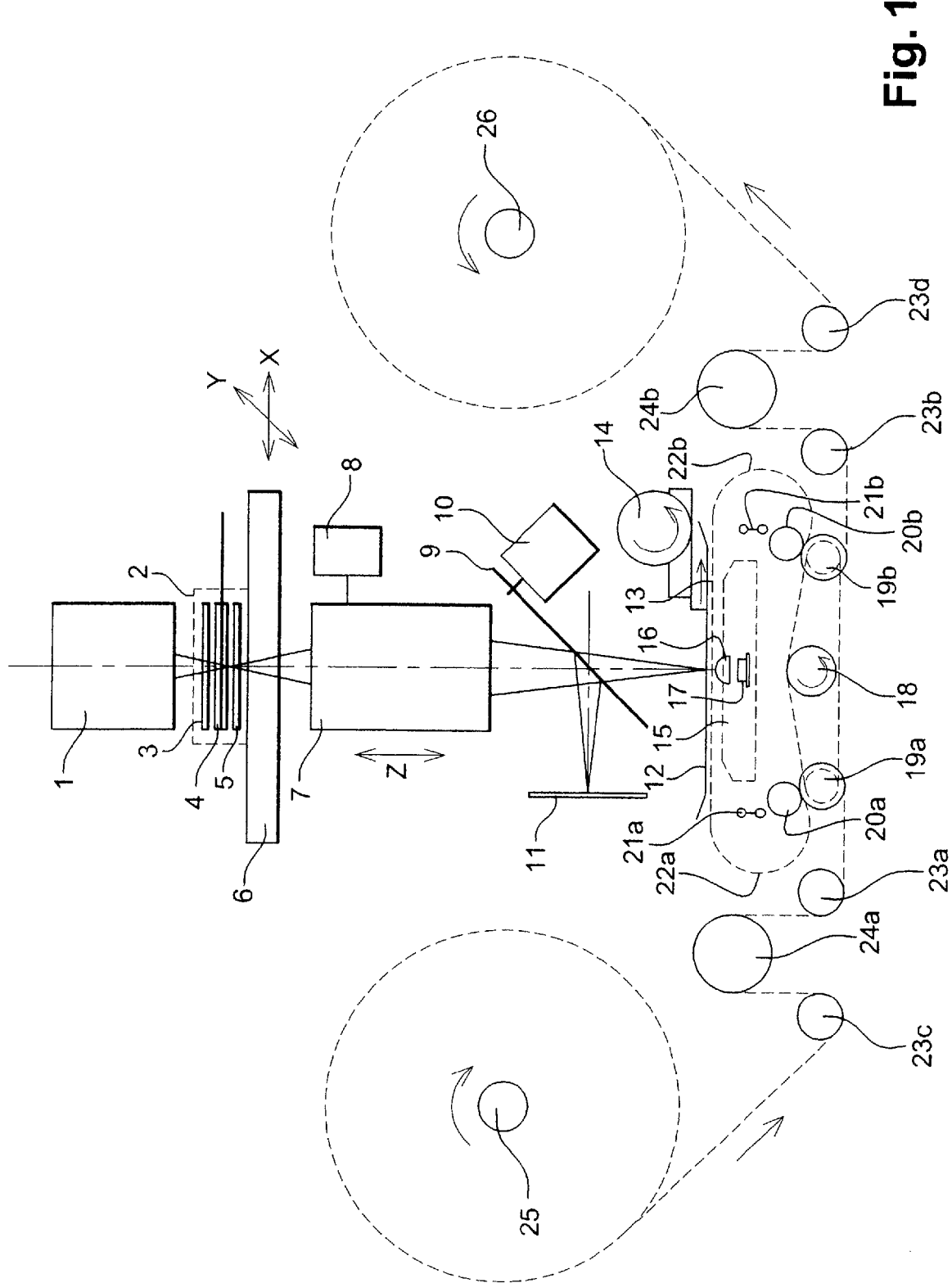
FIG. 1 shows a schematic perspective view illustrating the general operating principle of the installation according to the invention.
Figure 2:
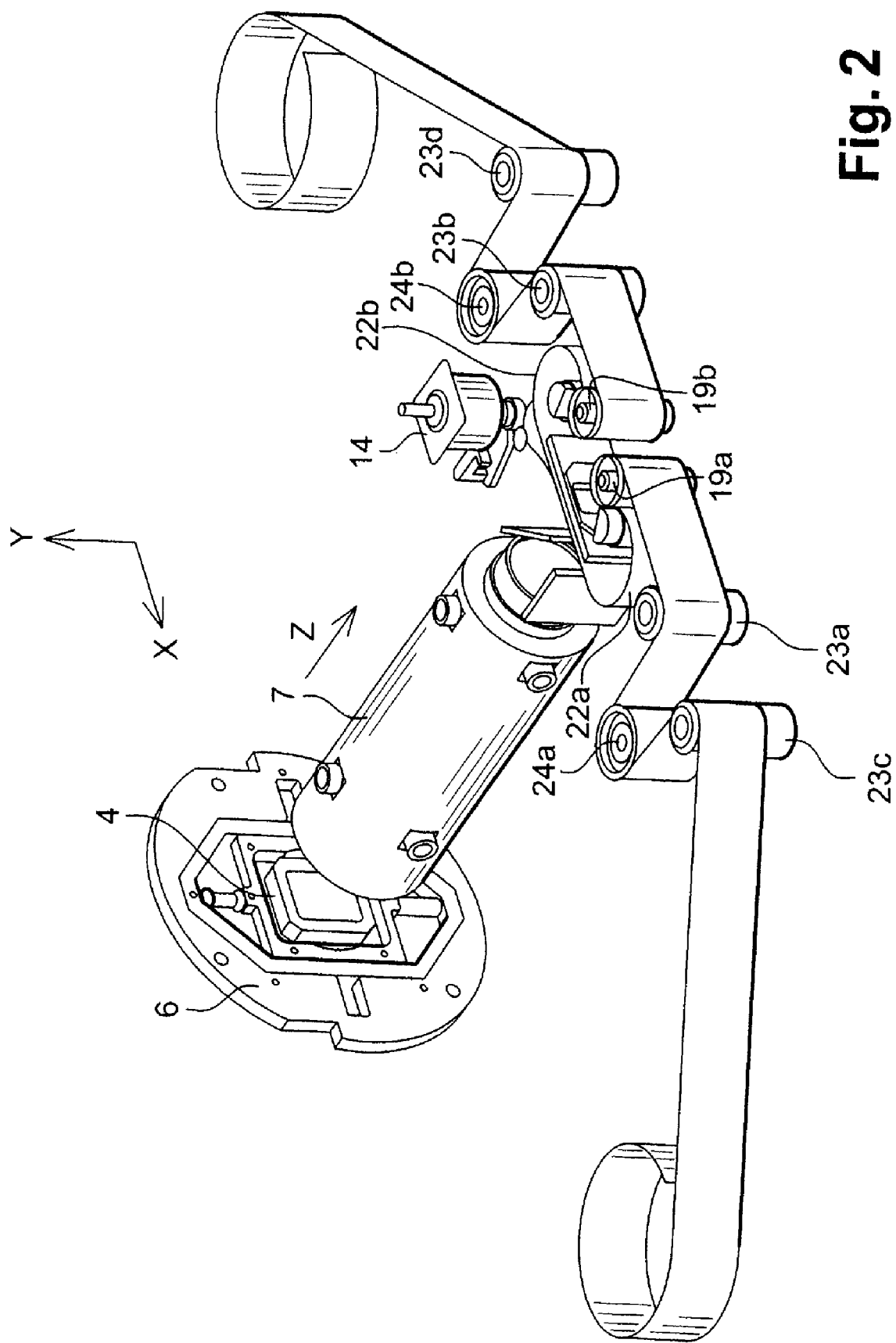
FIG. 2 is a view illustrating the scattering of the optical beam of said installation.

The installation according to the invention is in the form of a workstation basically comprising three volumes, respectively a volume for the storage of an unexposed film photoresist reel, a volume for storing a reel of said film photoresist obtained after exposure, and an actual exposure volume. These three volumes are each blocked off by a mobile light-proof cover.

Said station further comprises a control console, advantageously consisting of a tactile screen, and suitable for carrying out the various phases of exposure of the film.

The actual optics of the installation will first be described in detail.

This therefore first comprises a light source (1), consisting in this case of light emitting diodes. In the particular embodiment of the invention, these diodes are respectively:
 diodes emitting in the red, at a wavelength of 685 nanometers and an electric power of 12 to 16 watts;
 diodes also emitting in the red, but at a wavelength of 655 nanometers, and an electric power of 4 to 6 watts;
 a diode emitting in the green, at a wavelength of 530 nanometers and an electric of 3 to 5 watts;
 and finally, a blue diode emitting in the blue, at a wavelength of 455 nanometers and an electric power of 1 to 3 watts.

The first red diodes (emitting at 685 nanometers) are used to expose the film photoresist in order to make the "intermediate" film, the black and white archiving film or the prestige projection film.

As a corollary, the second red diodes (emitting at 655 nanometers) are used to expose the shooting film photoresist, more grainy than the printing films, because more sensitive, sometimes desired by the directors, for example to impart a silver appearance to the very smooth digital views. The spectral sensitivity of these films is centered on 650 nanometers in the red, against about 690 nanometers for the printing films.

These various diodes emit along the optical axis of the device and are designed in particular to illuminate, after shaping (for a controlled divergent beam) a display unit (2) in which the digital images to be exposed on the film photoresist are displayed.

This display unit (2) consists for example of an LCD screen (4) described in greater detail below, a linear input polarizer (3) and a linear output polarizer (5) (advantageously antiglare treated).

This LCD screen operates in transmissive mode, and has a resolution of 2048×1556 square pixels.

The display unit (2) is mounted on a piezoelectric stage (6), for the lateral shift of said unit along two "X" and "Y" axes perpendicular to the "Z" axis corresponding to the optical axis of the installation.

Such a stage is intended to allow for micro-movements, as described for example in document FR-A-2 836 238. In doing so, by multiplying the phases of exposure of a single view displayed on the LCD screen, the resolution in the exposed film is increased, serving in particular to obtain the 4K definition mentioned above.

This LCD screen could be replaced by a reflective Lcos (LCd on silicon) or even by a micro-mirror system (DMD), which do not need the lateral movement, thereby avoiding the use of a piezoelectric stage.

The optical signal issuing from the LCD screen then passes through a telecentric projection lens (7), which is also capable according to an advantageous feature of the invention of being moved along the "Z" direction of the optical axis of the installation by means of an electric motor (8) called focusing motor, operating in stepwise mode.

Downstream of the lens (7) a mirror (9) is mounted, turned at a 45° angle to the optical axis of the installation. This mirror can be moved in at least two positions:
 a retracted position, enabling the optical beam from the lens to expose the film photoresist in the film carrier described below; and
 a return position, positioned on the optical axis and causing the reflection of said light beam on an image analysis device (11) described below in greater detail.

The mirror is moved by means of an electric motor (10) of a type known per se. However, any other means would also be suitable, such as a solenoid for example.

The image analysis device (11) consists in this case of a monochrome high resolution CCD sensor of 4008×2672 square pixels, of the type sold by DALSA for example under reference FTF4027M, having a pixel size of 9×9 microns.

The advantage and operation of this image analysis device is described in greater detail below.

Thus when the mirror (9) is retracted, that is not positioned on the optical axis of the installation, the light beam issuing from the projection lens (7) exposes the film photoresist at the film carrier, of which the exposure plane constitutes the reference for focusing the lens. In this respect, it must be emphasized that the CCD (11) is located exactly symmetrically to said exposure plane with regard to the plane containing the mirror (9). This feature is important because of the role played by said CCD.

At the level of said film carrier, the film photoresist is conveyed in stepwise mode, each step corresponding to the exposure of one image on said film.

This advance in stepwise mode is provided by a motor also operating in stepwise mode (in this case 100 steps per turn), as sold by PORTESCAP. This motor actuates a claw which is inserted into the perforations with which the side edges of the film photoresist are provided. It has the feature of a very high angular acceleration, typically 50 000 rad/s$^2$, allowing rapid movement of the film photoresist view by view between each exposure phase. Each motor turn causes an advance of four perforations of the film corresponding to one view.

The progress of the film photoresist is described below. Said film is stored on a storage reel, itself mounted on a motor (25) creating a variable torque in the reverse direction of rotation of the film advance, in order to supply a constant tension typically between 200 and 500 grams on the film, according to the diameter of the reel, that is according to the quantity of film present in the reel.

As a corollary, after exposure, the film is rewound on a takeup reel mounted on a motor (26), creating a variable torque, this time in the direction of rotation of the film advance, also for the purpose of obtaining a constant tension of similar scale as that of the motor of the supply reel motor, here also according to the diameter of the film present on the reel.

Between these two reels, the film first passes through a deflector, in this case consisting of the return rolls (23a) and (23c) and the roll (24a) intended for lightproofing the compartments in which the reel of unexposed film photoresist and the exposure zone are located.

After this deflector, the film is taken up by a toothed roll called film supply roll (19a) which conveys it to the film carrier while creating a film loop (22a) prior to its introduction into the film carrier. As a corollary, after the film carrier, a film loop (22b) is also created before being taken up by another film supply roll (19b), and returned to a new set of deflector rolls for lightproofing (23b, 23d and 24b) and rewinding of the exposed film on the storage reel.

The rolls (19a) and (19b) are actuated by means of a motor (18) advancing continuously. These rolls or drums, as already stated, are toothed, the teeth cooperating with the perforations with which the film photoresist is provided. The speed of rotation of said rolls (19a and 19b) is selected so that, also considering the stepwise advance of the film in the film carrier produced by the motor (14), and therefore the operating frequency of said motor, the abovementioned loops are created, each constituting a damping zone or buffer zone, the length of the loop being selected, by selection of the respective speeds of the motor (18) on the one hand, and the motor (14) on the other hand, these buffer zones being intended to avoid hindering the stepwise advance of the film in the film carrier.

In case of malfunction of said motors, the installation also comprises sensors respectively (21a) in the neighborhood of the upstream loop (22a), and (21b) in the neighborhood of the downstream loop (22b), which are actuated if the loop concerned becomes too small respectively upstream and/or downstream of the film carrier to perform its buffer role effectively. These sensors are of a conventional type, so that there is no need to describe them here in detail.

After exposure, the film photoresist is developed by a conventional chemistry well known in the field of silver films.

As already indicated, the film carrier is intended to position the film to be exposed in the exposure plane, at the level at which the beam issuing from the projection lens is focused. The film slides through the film carrier and is maintained in the exposure plane by means of a film press.

The use of the CCD (11) (or Cmos or another matrix sensor) according to the invention is described below. As indicated in the introduction, it is intended to analyze the signal issuing from the lens (7) and, by the application of specific algorithms, to optimize the uniformity of the lighting issuing from the light source (1), of the liquid crystal screen (12) and of the lens (7).

It is also intended to measure the movement of the piezoelectric stage (6) which serves to double the resolution, and therefore to perfectly adjust the control parameters.

In actual fact, the objective of the use of this CCD and the subsequent processings is to calibrate all the elements which influence the image quality, in order to maintain them within extremely close tolerances, without the action of a technician, and to facilitate the diagnosis and most of the maintenance operations. Thus it allows the following:

calibration of the focusing;
adjustment of the lens axis;
calibration of the movement of the piezoelectric stage;
calibration of the flicker of the LCD screen;
calibration of the PRNU of the LCD screen;
calibration of the exposure light level and the exposure time;
calibration of the unwanted image level (echo effect); and
calibration of lateral chromatic aberrations.

The installation therefore serves to avoid the conventional loop consisting in exposing the film, developing it, and analyzing the film thus developed, and finally adjusting the various exposure parameters.

This offers a dual advantage: substantial gain in time, and possibility of automating most of the adjustments.

In fact, prior to the exposure of a film photoresist, this calibration is carried out by the use of this CCD. It is in fact known that a small difference in transmission exists between the various pixels of a liquid crystal screen, this difference being inherent in the very construction of these LCDs. Furthermore, it is also well known that the LCDs cause the occurrence of vignetting.

In other words, this CCD sensor associated with the ad hoc algorithms behaves as an onboard maintenance technician, capable of adjusting all the installation parameters associated with image quality.

According to one advantageous feature of the invention, the installation also comprises a photodiode (17) associated with a lens (16), both located along the optical axis of the installation. The lens (16), for example made of antiglare treated sapphire, has a convex face in the direction of the film and serves as a film support point at the center of the image when said film is in place in the film carrier. It focuses the light transmitted through said film toward the photodiode (17). In other words, the lens is mounted and centered on the film press device associated with the film carrier. The associated photodiode cell detects the light received.

Thus, here also before the exposure of a film photoresist, an already exposed film is passed through the film carrier and is illuminated with the light source (1), thereby enabling the photodiode cell (17) to act, in combination with an associated software, in the same way as a densitometer. It also serves for calibration by sending test patterns stored in the PC associated with the installation, in order to vary a number of parameters of the installation, and in particular the gain of the LCD, the orientation of the polarizers (input or output or both), the tables of correspondence of exposure, the exposure time, to take account of the emulsion coating the film photoresist.

The photodiode cell (17) associated with a logarithmic amplifier generates a voltage, which depends on the data received in the three fundamental colors red, green and blue for each of the test patterns, a voltage that is conventionally translated into optical density.

This serves to adjust the operating parameters of the LCD screen and the exposure time.

It is easy to observe the various advantages procured by the installation according to the invention. First, in terms of image quality, a quality is obtained that is substantially superior to that obtained by installations using laser technology. This quality is also maintained almost automatically by the use of the CCD and its associated algorithmic software.

According to another advantage of the invention, the production rate is optimized both in 2K resolution and in 4K resolution, by the use of the LCD screen.

The image matrix sensor (CCD, Cmos or [other]) used is further capable of automatically adjusting the installation in a closed loop. It therefore performs an optimum and permanent adjustment of the installation, without external action, therefore saving the costs of a technician.

Moreover, due to the presence of the photodiode cell acting like a densitometer, the installation is capable of automatically measuring a test film, and of thereby adjusting the exposure parameters according to the inherent characteristics of the film emulsion and the reel activity of the chemistry. It is in fact known that the type of emulsion of a film undergoes a number of variations from one film to another, and that in addition, the chemistry must be regularly changed, necessarily demanding the adjustment of the exposure parameters in question. This procures a major advantage in the considerable reduction of the down time of the machine during the calibrations.

The invention claimed is:

1. An installation for exposing a cinematographic film from digital images, said installation comprising:
    a light source capable of emitting in three fundamental colors red, green and blue;
    means for storing film photoresist, respectively for exposure and already exposed;
    a film carrier suitable for positioning said film photoresist accurately at a level of an exposure plane;
    a projection lens capable of projecting the digital images at the exposure plane of said film carrier;
    a liquid crystal matrix where the various digital images to be exposed are displayed, located on a light beam issuing from the light source;
    a retractable mirror oriented at 45° to an optical axis of the projection lens; and
    an image analysis device positioned symmetrically to said film carrier exposure plane with regard to a plane containing said mirror when the latter is in place on the optical axis of the projection lens, and suitable, when said mirror is positioned on the optical axis of the projection lens, for receiving the digital image transmitted by the liquid crystal matrix issuing from the projection lens, the image analysis device processing signals thereby detected using an associated software, for setting parameters of the optical members of the installation, which includes at least the light source and of the liquid crystal matrix, and for adjusting and controlling a focusing of the projection lens.

2. An installation for exposing a cinematographic film as claimed in claim 1, wherein the liquid crystal matrix is selected from the group comprising LCD type liquid crystal screens, cathode ray tubes (CRT) screens, Lcos (LCD on silicon) screens and DMDs.

3. An installation for exposing a cinematographic film as claimed in claim 1, wherein the image analysis device consists of a charge-coupled circuit CCD or a Cmos, of which the signals are transmitted to a microprocessor or electronic circuit board incorporating processing algorithms required to optimize the parameters of the installation.

4. An installation for exposing a cinematographic film as claimed in claim 2, in which the liquid crystal matrix consists of a liquid crystal screen, wherein the display unit formed by the liquid crystal screen and upstream and downstream polarizers associated therewith, is mounted on a piezoelectric stage, suitable for a lateral shifting that is perpendicular to an optical axis of the installation.

5. An installation for exposing a cinematographic film as claimed in claim 1, further comprising a photodiode associated with a lens, located on the optical axis of the projection lens immediately downstream of the film carrier, suitable for making a densitometric analysis of a film exposed by the installation.

6. An installation for exposing a cinematographic film as claimed in claim 1, wherein the film photoresist advances in a stepwise mode in the film carrier, using a stepping motor provided with a claw, which cooperates with perforations provided on lateral edges of said film.

7. An installation for exposing a cinematographic film as claimed in claim 6, further comprising means for providing buffer loops upstream and downstream of the film carrier, consisting of a motor operating in D.C. mode, actuating drums, respectively upstream and downstream, cooperating with said film, and of which a speed of rotation is synchronized with an operating frequency of the stepping motor providing an advance of the film at the film holder.

8. An installation for exposing a cinematographic film as claimed in claim 1, wherein the film photoresist is stored on a storage reel before exposure, mounted on a motor creating a variable torque in a reverse direction of rotation of an advance of the film, so as to supply a constant tension on the film, according to a diameter of the reel, that is, according to a quantity of film present in the reel.

9. An installation for exposing a cinematographic film as claimed in claim 1, wherein the film photoresist is stored on a takeup reel after exposure, mounted on a motor creating a variable torque in a direction of rotation of an advance of the film, so as to supply a constant tension on the film, according to a diameter of the reel, that is, according to the quantity of film present in the reel.

10. An installation for exposing a cinematographic film as claimed in claim 1, wheerin the projection lens is associated with an electric motor suitable for moving it in translation along the optical axis of the installation, in order to permit the adjustment of the focusing on the exposure plane of the film carrier.

11. An installation for exposing a cinematographic film as claimed in claim 1, wherein the mirror is retractable from the optical axis of the installation by means of an electric motor.

* * * * *